(12) United States Patent
Anderson et al.

(10) Patent No.: US 7,509,791 B2
(45) Date of Patent: Mar. 31, 2009

(54) UNIVERSAL TOP SEALING SYSTEM FOR GABLE TOP PACKAGE

(75) Inventors: Paul J. Anderson, Woodbury, MN (US); Fredrik Myllykangas, Uddevalla (SE); Lars Skarin, Uddevalla (SE); Caroline Blom, Uddevalla (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 11/745,936

(22) Filed: May 8, 2007

(65) Prior Publication Data

US 2008/0276576 A1    Nov. 13, 2008

(51) Int. Cl.
*B65B 43/26* (2006.01)

(52) U.S. Cl. .......................... 53/565; 53/266.1; 53/484; 53/351; 53/353; 493/184; 493/452

(58) Field of Classification Search ................ 53/266.1, 53/484, 565, 351, 353; 493/184, 452, 183, 493/185
See application file for complete search history.

(56) References Cited

U.S. PATENT DOCUMENTS

| 3,890,765 | A | * | 6/1975 | Farfaglia et al. ............... 53/563 |
| 4,078,364 | A | * | 3/1978 | Schmidt .................... 53/372.4 |
| 4,738,077 | A | * | 4/1988 | Wakbayashi et al. ........ 53/372.7 |
| 6,430,899 | B1 | | 8/2002 | Cicha |

FOREIGN PATENT DOCUMENTS

WO  WO 2004/054879  7/2004

* cited by examiner

*Primary Examiner*—Hemant M Desai
(74) *Attorney, Agent, or Firm*—Levenfeld Pearlstein, LLC (57) ABSTRACT

A top sealer for a gable top package having a sealed top fin includes an arm support and a pair of opposing arms pivotally mounted to the arm support. The arms each have a sealing jaw at about an end thereof. The arms are pivotal to move the sealing jaws toward and away from one another through an arc. The arm support is linearly movable toward and away from the package, as the arms pivot, to move the sealing jaws downward, toward the package, to alter the arc of the pivoting sealing jaws.

11 Claims, 8 Drawing Sheets

UNIVERSAL TOP SEALING SYSTEM FOR GABLE TOP PACKAGE

BACKGROUND OF THE INVENTION

This invention is directed to an apparatus and method for sealing the fin of a gable-top carton. More specifically, the invention pertains to a top sealer jaw assembly for sealing and creasing the gable panels and fin of a gable top carton, and a method therefor.

Gable top cartons are in widespread use. Such cartons have been known for most of the twentieth century. The characteristic simplicity and widespread acceptance have helped to maintain their popularity as cartons for traditional products, such as liquid food products, for example, milk and juice.

Improvements to gable top cartons continue and in one such improvement, access to the product is provided by a spout that is integrally sealed to one of the gable panels. In a "conventional" spout arrangement, an opening is formed in the gable panel and a plastic or like spout is welded or sealed to the panel. A cap, such as a threaded closure is fitted onto the spout to provide resealability of the container. Such spouts have come into widespread use and acceptance for their ease of access to the product and their ability to help maintain product freshness.

In that both the products and consumers' desires vary, as would be expected, gable top cartons are provided in different sizes that correspond to different volumes and package standards. For example, gable top cartons are provided in standard sizes of 70 mm×70 mm, 70 mm×95 mm, 91 mm×91 mm and 95 mm×95 mm.

In order to seal the top fin of these cartons, known form, fill and seal packaging machines use a horizontally reciprocating jaw or anvil arrangement. The anvils include openings to accommodate the package spouts and caps so that the spouts and caps do not get crushed by the moving anvils. The anvils are mounted to the packaging machine by a pair of pivoting arms such that the movement of the anvils is actually a slight arcuate movement with the anvils contacting the carton in a downward movement portion of the cycle. Such an arrangement is illustrated in Cicha, U.S. Pat. No. 6,430,899, which is commonly assigned with the present application and is incorporated herein by reference.

While this arrangement works quite well for its intended purpose, it has been found that the downward movement of the anvils can result in scraping along the top fin and/or plowing down on the carton gable panels, both of which actions are to be avoided. In addition, it is sometimes difficult to accommodate the closure spouts and/or caps used with today's packages. It has been found that the anvils often contact (e.g., scrape) the closures during the top sealing process. Moreover, the anvil arrangements need to be different for each different carton size.

Accordingly, there is a need for a standard top sealer that is usable with a variety of different sizes of cartons. Desirably, such a top sealer employs a motion that reduces or eliminates downward motion on the top fin as the fin is being sealed. More desirably, such an arrangement eliminates the plowing down effect of known sealers and accommodates today's known closure systems.

BRIEF SUMMARY OF THE INVENTION

A top sealer for a gable top package is configured to that is formed, filled and sealed on a form, fill and seal packaging machine. The top sealer includes a frame and a carriage carried by the frame mounted for reciprocation relative to the frame. The carriage defines in part a cylinder. The carriage has a cam follower mounted thereto.

The sealer includes a pair of opposing arms operably connected to the carriage. Each arm supports a respective sealing jaw at about one end and are operably connected to the carriage at an opposite end.

A support portion is configured for mounting the arms thereto. Each arm is pivotably mounted to the support portion at a pivot point that is between the sealing jaw and the opposite end. The arms are mounted for pivoting movement of the sealing jaws along an arcuate profile toward and away from one another. The support portion also has a cam follower mounted thereto.

A piston resides in the cylinder and including an extension portion operably connected to the support.

A cam element defines a first cam track for the carriage cam follower and a second cam track for the support portion cam follower. Preferably, the cam is a rotating cam element with an inner track for engaging the support portion cam follower and an outer portion for engaging the carriage cam follower. Rotation of the cam moves the carriage (linearly) which pivots the arms to move the sealing jaws toward one another. Rotation of the cam also moves the pivot point (of the arms) to alter the sealing jaw movement profile. In a present sealer, the sealing jaw movement profile is steepened at a beginning of the profile and flattened subsequent thereto.

The top sealer support portion is mounted to the carriage by the piston. The piston is actuated at the end of the sealing cycle to effect a predetermined force on the top fin by the sealing jaws. One of the sealing jaws includes an open central region for accommodating a closure on the gable top package.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 1:
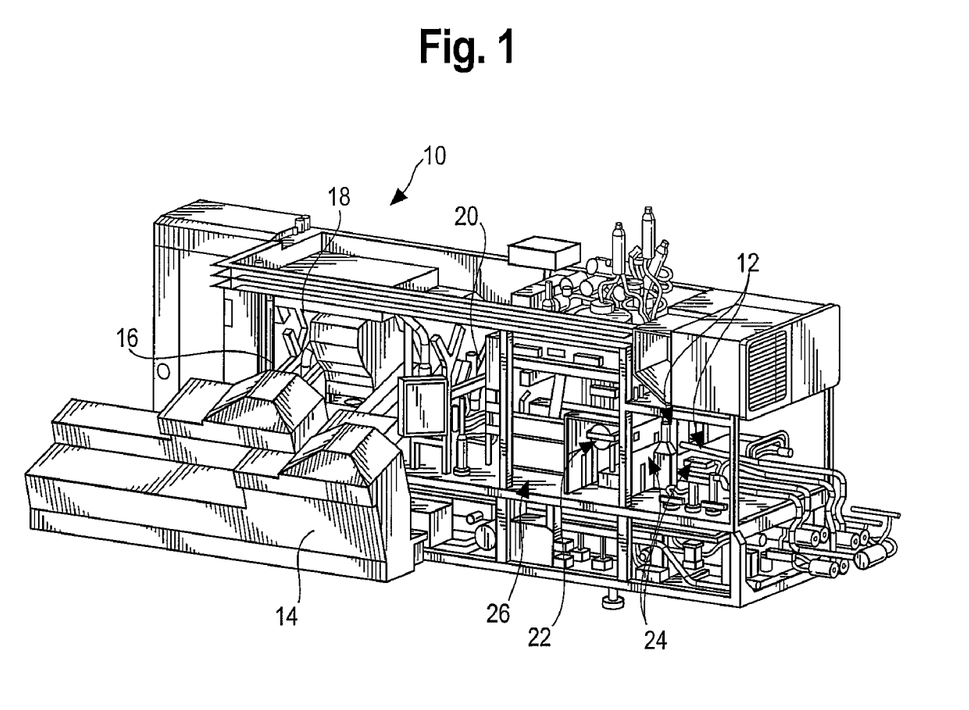
FIG. 1 is a perspective view of an exemplary form, fill and seal packaging machine having a universal top sealing system in accordance with the principles of the present invention.

Referring now to the figures and in particular to FIG. 1, there is shown a form, fill and seal packaging machine 10 having a top sealer 12 embodying the principles of the present invention. The form, fill and seal machine 10 is configured generally to store a series of carton blanks in a flat, folded form, erect the blanks into a tubular form, fold and seal the bottom flaps of the carton, fill and seal the cartons C as they move through the machine 10. The form, fill and seal packaging machine 10 can be such as that disclosed in Katsumata, U.S. Pat. No. 6,012,267, which patent is assigned to the assignee of the present invention and is incorporated herein by reference.

To effect the form, fill and seal process, the packaging machine 10 includes a carton magazine 14 for storing the flat, folded carton blanks, a carton erection station 16 and a bottom forming and sealing station 18 to erect the cartons into a tubular form and to fold and seal the carton bottom. The machine 10 typically also includes a sterilization station 20 for sterilizing the cartons and includes a filling station 22 at which the cartons are filled with product. Following the filling station 22, the carton top panels F are folded and sealed at a top folding and sealing station 24.

The cartons C are then off loaded from the form, fill and seal packaging machine 10. The illustrated packaging machine 10 includes a conveyor 26 for transporting a series of cartons to and through each of the stations.

The machine 10 is configured to smoothly feed packages (with or without closures S) into the top sealer 12 so that closures S (if used) do not come into contact with the sealing jaws 28, as the top seal of the fins F is formed. Advantageously, the top sealer 12 can be used with a variety of different sizes of cartons without the need to change out many of the components of the sealer 12, as discussed below.

Figure 2:
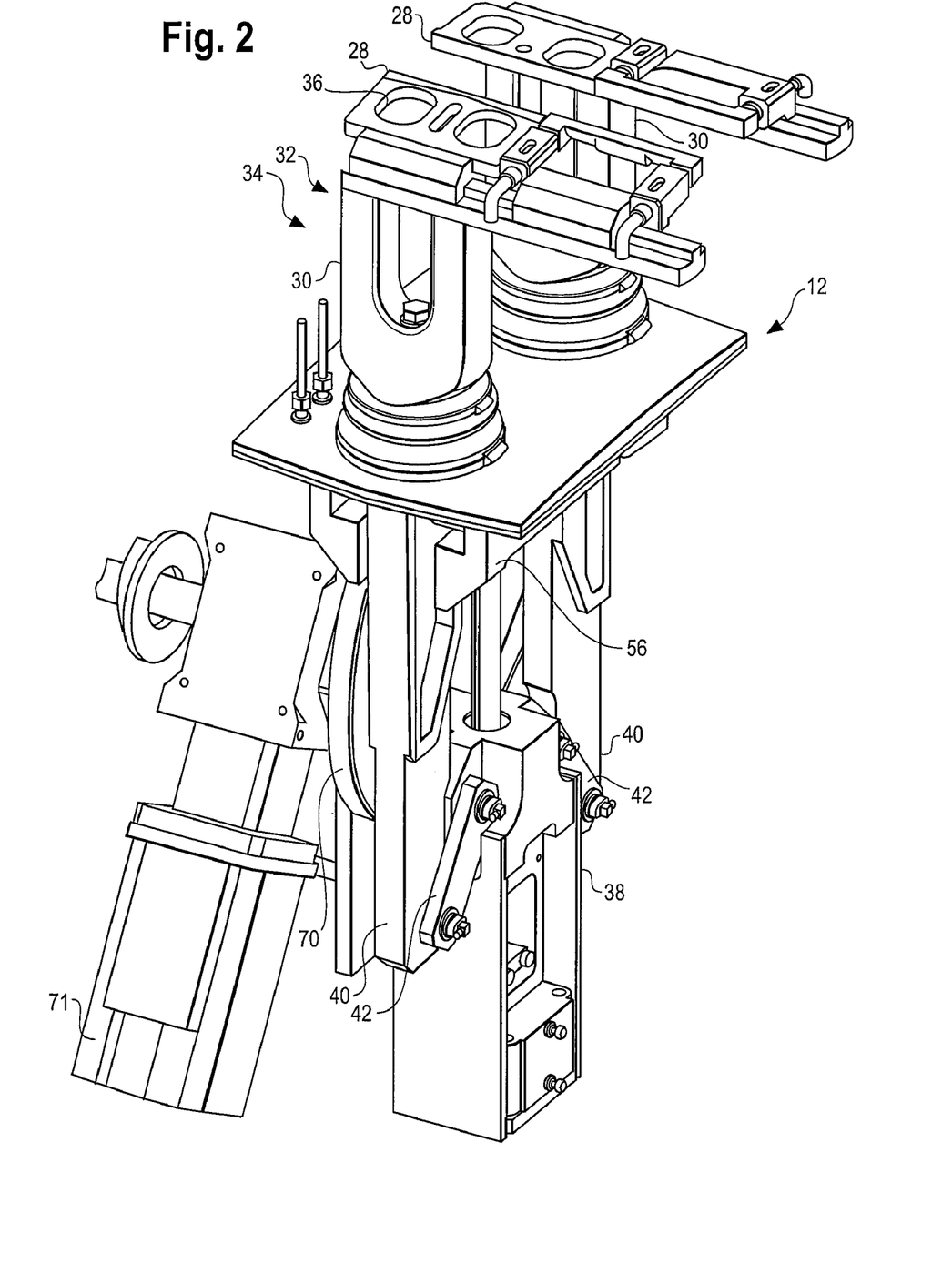
FIG. 2 is a perspective view of the universal top sealer.

The top sealer 12 includes a pair of opposing sealing arms 30. The arms 30 each include an upper portion 32 having the sealing jaw 28 mounted thereto at one end 34 of the arm 30. The arms 30 and thus the jaws 28 move toward one another and press the top fin panels $F_1$, $F_2$ together, between them, to seal the package C. As seen in FIG. 2, one or both of the jaws 28 includes an open central area 36 that is adapted to accommodate the closure caps S as the jaws 28 move into position on the top fin F. As such, during the sealing cycle, the jaws 28 move "over" the cap S with the cap S received in the open area 36.

The arms 30 are each mounted to a carriage 38 at an opposite end 40 of the arm 30 (opposite of the jaws 28). The arms 30 are mounted to the carriage 38 by a press beam 42 that serves as a link. The link 42 is pivotally mounted to the carriage 38 at a first joint 44 and is pivotally mounted to the arm 30 at a second joint 46. As will be explained in more detail below, the carriage 38 includes a first portion 48 that has the press beams 42 mounted thereto and a second portion 50 that drives a reciprocating motion of the carriage 38. The second portion 50 includes a cylinder 52 that has a piston 54 positioned therein. The piston 54 is connected to the first portion 48 and thus operably connects the first and second carriage portions 48, 50 to one another.

The arms 30 are also pivotally mounted to a T-support 56 at a pivot location 58, such as by the illustrated pivot pin, that permits the arms 30 to pivot relative to the support 56. The arms 30 are mounted to the support 56 at an intermediate location (or third joint 60), that is between the jaw 28 and the second joint 46, along the length of the arm 30. Essentially, the arms 30 pivot about the third joint 60. The pivoting movement is effected by the reciprocating (up and down) motion of the carriage 38. As the carriage 38 reciprocates, the press beams 42 rotate the second joints 46 to define an arcuate path for the jaws 28.

The T-support 56 is also mounted for reciprocating motion, and moves in the same relative direction as the carriage 38. That is, the T-support 56 and carriage 38 move upward and downward as indicated by the arrow at 62, toward and away from the carton C at the same time. The carriage 38, however, moves a greater linear distance, and effects the arcuate or pivoting movement of the arms 30. As set forth below, movement of the T-support 56 moves the pivot location 58.

Figure 3:
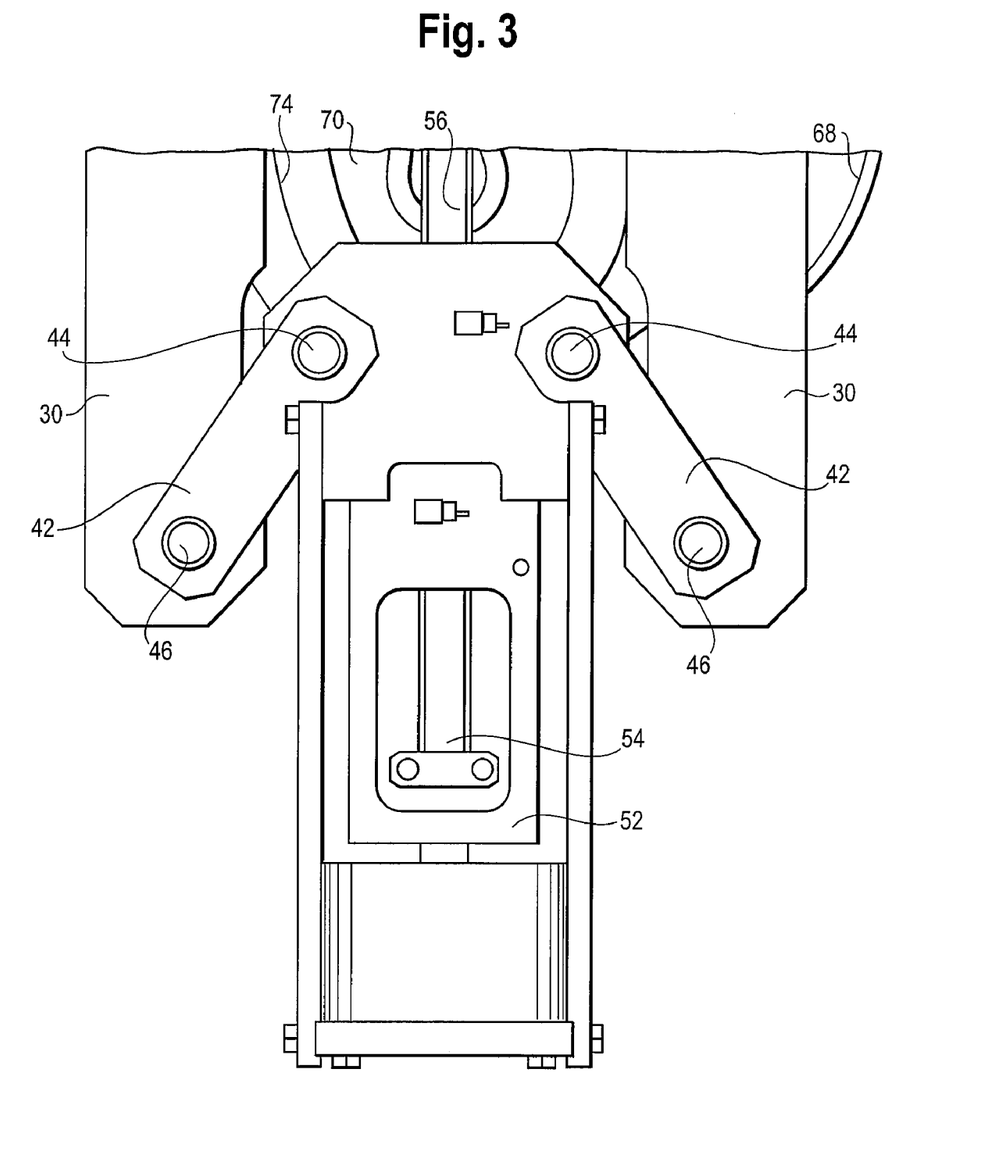
FIG. 3 is a partial front view of the sealer showing the lower portion of the sealing arms and press beams mounted to the carriage, and with the arms in the open position.
Figure 4:
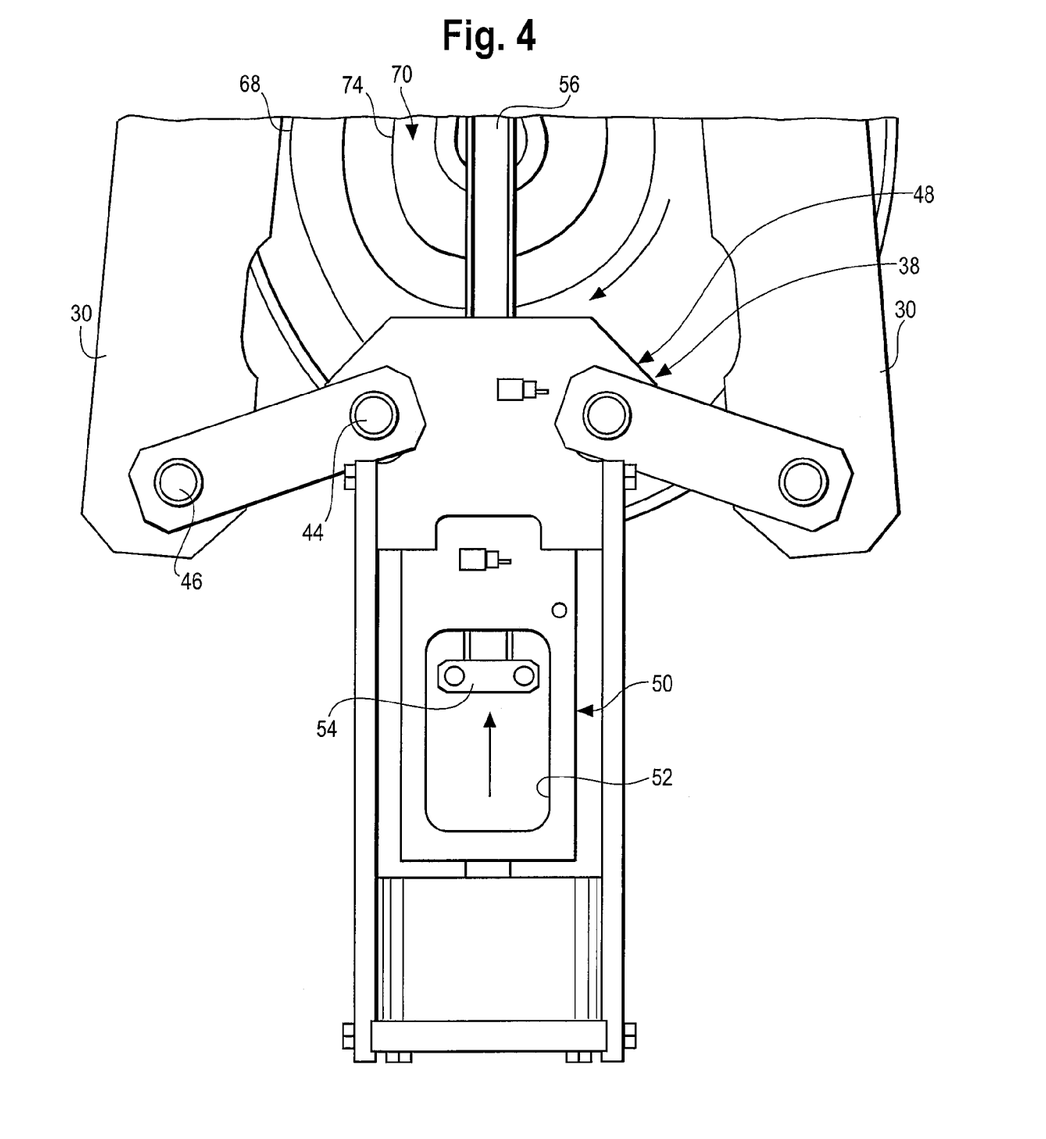
FIG. 4 is a partial front view of the sealer similar to FIG. 3 showing the lower portion of the sealing arms and press beams mounted to the carriage, but showing the carriage moving downward and the lower portion of the sealing arms moving outward (which moves the upper portion of the arms inward) toward the sealing position.
Figure 7:
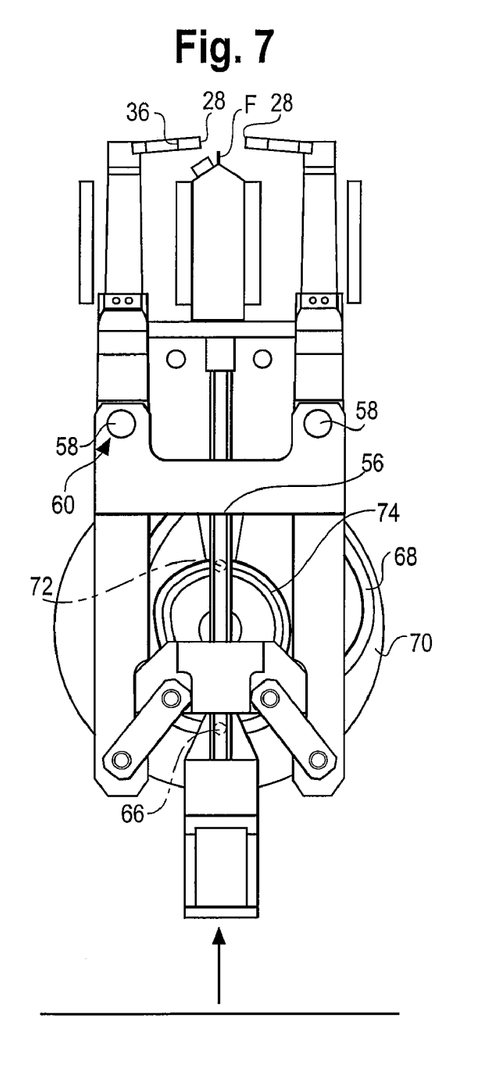
FIGS. 7 and 8 illustrate the top sealer, with a gable top carton therein, in the open (FIG. 7) and sealing (FIG. 8) positions.
Figure 8:
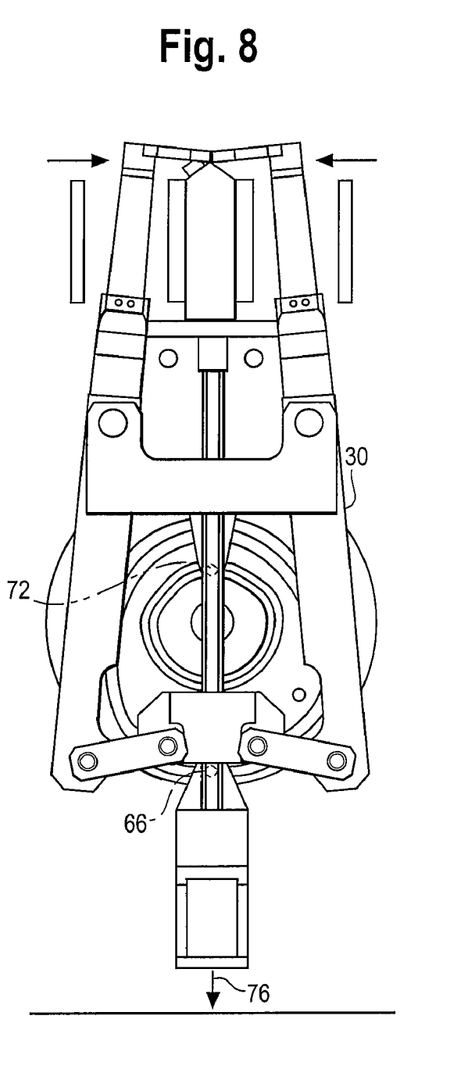
Figure 9:
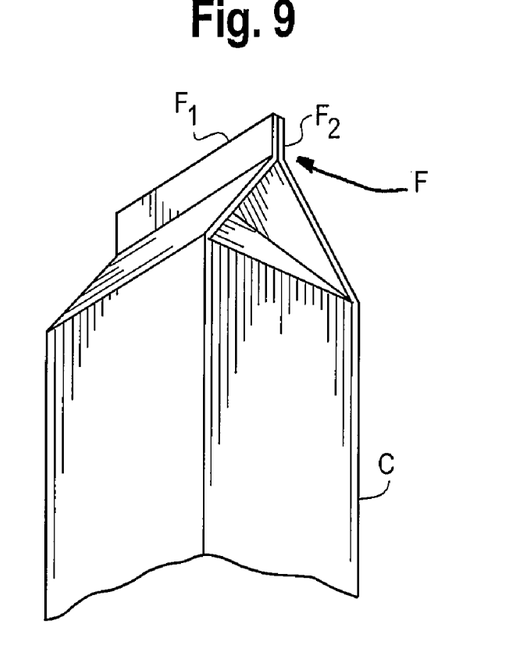
FIG. 9 is a perspective view of the upper end of a carton.

Referring to FIGS. 3 and 4, the movement (e.g., reciprocation) of the carriage 38 and the T-support 56 are carried out by use of a cam arrangement as indicated generally at 64. In a present system, the carriage 38 (at the second portion 50, e.g., the cylinder 52 containing portion) includes a cam follower 66 that rides in an outer track 68 in a rotating cam element 70. The cam element 70 is driven by a motor 71. Referring briefly to FIGS. 7 and 8, the T-support 56 likewise has a cam follower 72 that rides in a different, smaller or inner track 74 in the cam element 70. This cam arrangement 64 (of the carriage follower 66 and cam 70) provides for the pivoting motion of the arms 30 by virtue of the carriage 38 moving relative to the T-support 56, and the connection of the arms 30 to the carriage 38 by the press beams or links 42.

Movement of the T-support 56 (by virtue of the T-support cam follower 72 moving in the cam track 74) moves the relative position of the pivots 58 for the arms 30. As the arms 30 pivot inwardly toward the fin panels F, the T-support 56 moves downward (as indicated by the arrow at 76). This in effect brings the jaws 28 downward at a steeper rate (in a smaller arc) so that the jaws 28 can pass over and behind the closure S (that is, between the fin F panels and the closure S) without contacting the closure S. Although the result is that the closure S is avoided, because the jaws 28 are moving at a steeper angle (that is, in a decreasing downward arc), this movement or curve profile could otherwise result in the jaw's downward scraping along the top fin F and/or plowing down on the carton gable G.

Figure 5:
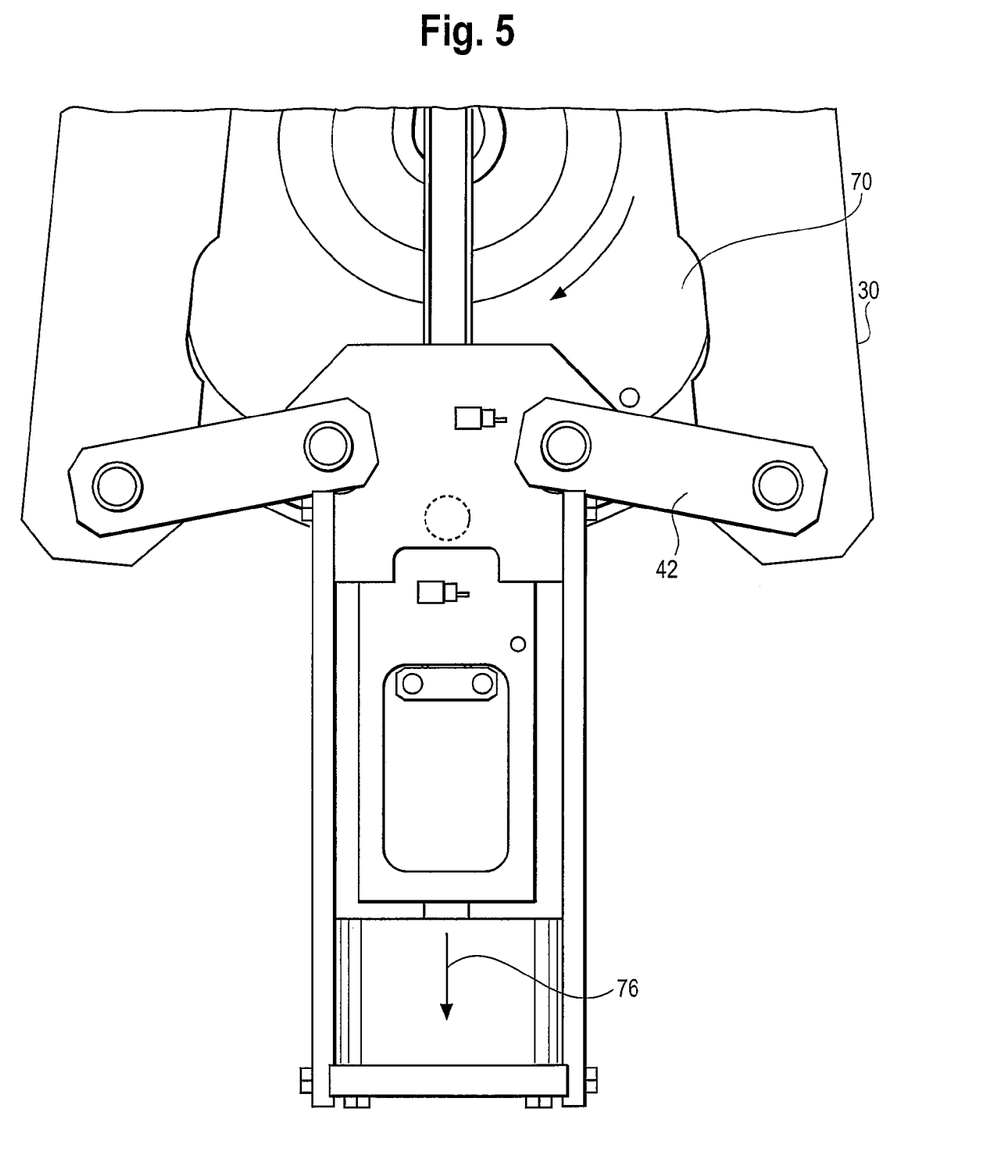
FIG. 5 is view similar to FIG. 4 showing the carriage in the lower most position which in turn moves the sealing into the sealing position, and showing movement of the cylinder.
Figure 6:
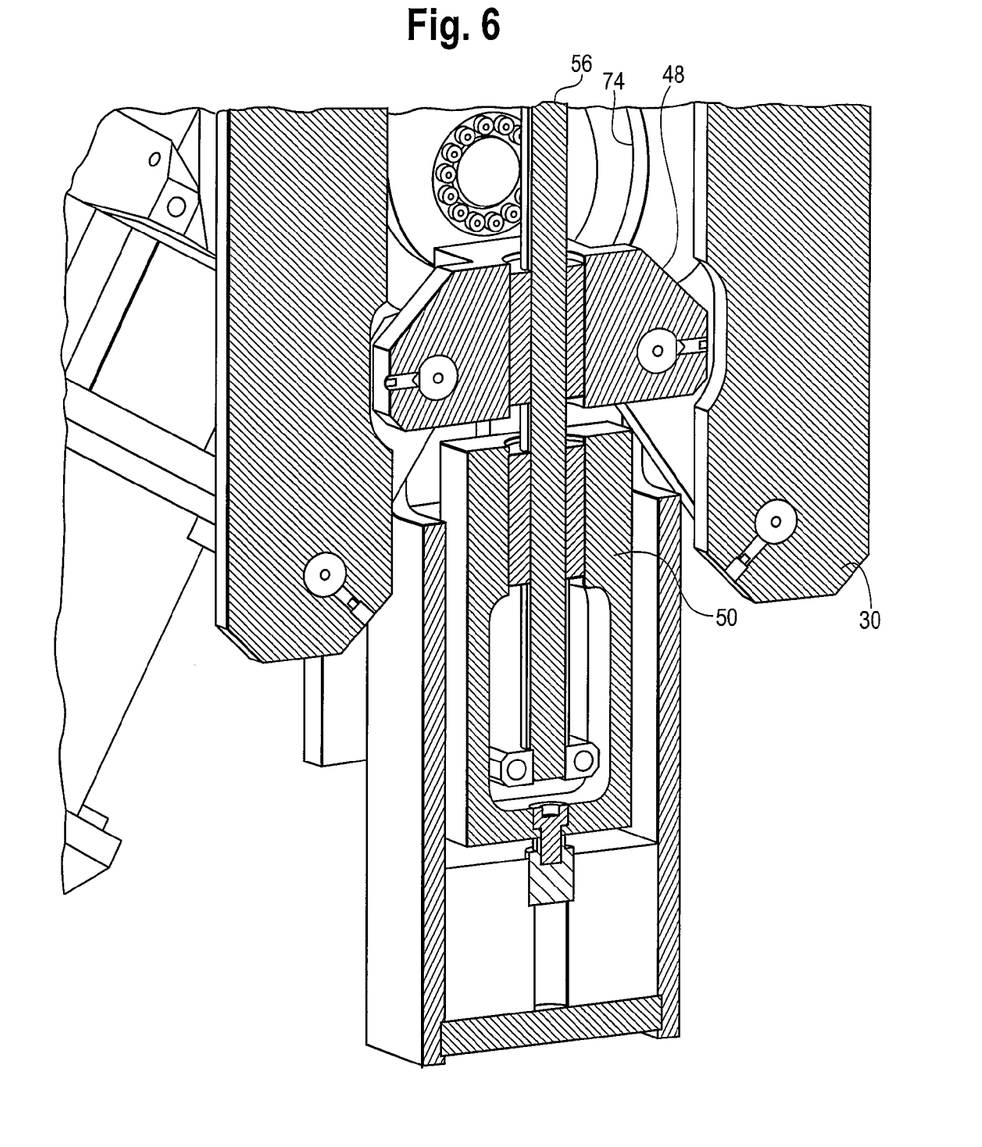
FIG. 6 is a partial cross-sectional view of the top sealer with the arms in the fully open position.

In order to correct the curve profile, the downward movement of the T-support 56 is arrested or slowed and the pivotal movement of the arms 30 continues. The continued arm movement, however, is carried out not by the cam action of the carriage 38, but by actuation of the piston 54. Referring to FIGS. 5 and 6, the piston 54 is actuated which exerts a force to move the carriage first portion 48 further downward. This in effect further pivots the arms 30 (through the press beams 42) to exert a preset force (at the jaws 28) on the top fin panels F.

In a present system, actuation of the piston 54 flattens out the arc of the jaws 28 and brings the jaws 28 into contact with the fins F in a more horizontally translated motion. As will be appreciated, this horizontal motion reduces the potential for scraping along the fin F and/or plowing down on the carton gable G.

The piston 54 is pneumatically actuated to exert a predetermined or preset force, and, that force translates into a predetermined force that is applied (inward) by the jaws 28 on the top fin panels F to form the seal of the panels F. As such, the force that is applied to the form the top seal is to some extent independent of the machine force exerted by the rotating arms 30, and instead is determined to a great extent by the piston 54 force. Advantageously, this reduces the need to maintain extremely tight tolerances between the jaws that a non-piston arrangement would otherwise require to assure proper sealing (e.g., proper distances between the closed jaws).

As set forth above, one of the benefits of the present top sealer 12 is that it is substantially a universal unit. One sealer 12 can be used for 70 mm×70 mm, 70 mm×95 mm, 91 mm×91 mm and 95 mm×95 mm cartons. There are, of course certain components that may be required to be designed for specific carton sizes (for example, it is envisioned that one cam 70 can be used for 70 mm×70 mm and 70 mm×95 mm cartons while a different cam is needed for the 91 mm×91 mm and 95 mm×95 mm cartons, and it is anticipated that the pressure plates (jaws 28) will need to be specific to a carton size). Nevertheless, the major components of the drive systems and overall sealer 12 can be used in different machines that accommodate different carton C sizes.

In a present system 12, the force exerted by the jaws 28 on the fin panels F is 8000N for the 70 mm×70 mm cartons and 12000N for the 95 mm×95 mm cartons. This corresponds to a cylinder 52 force of 2358N and 3657N, respectively.

Figure 10:
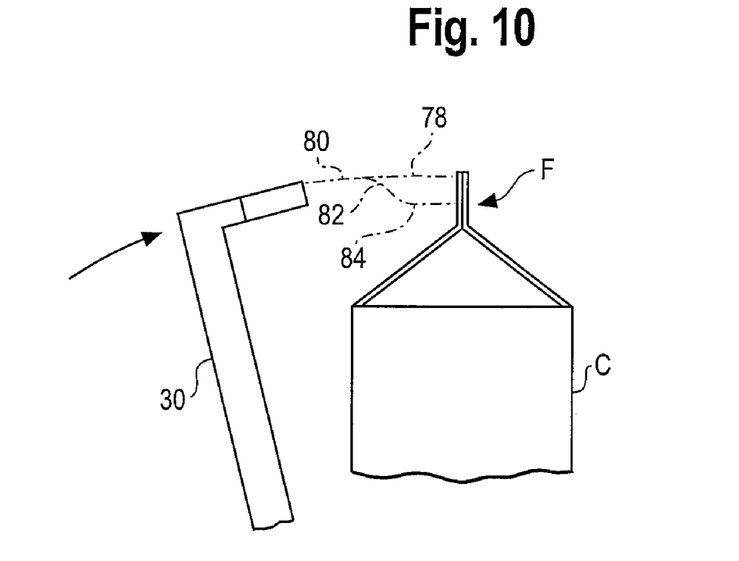
FIG. 10 is an exaggerated profile of the movement of the sealing jaws.

It will be appreciated that the multiple and varying curve portions are effected by use of a single cam arrangement 64 and a cylinder 52 and piston 54 arrangement. FIG. 10 is an exaggerated illustration of the curve profile of the jaws 28 compared to a circular arc profile (indicated at 78). In a first portion of the cycle (the curve) indicated at 80, the sealing jaws 28 are pivoted inwardly along a circular arc by pivoting of the arms 30. In a second portion of the curve, indicated at 82, the arc is steepened, increasing the downward motion to avoid contact with the closure cap S and to move the sealing jaw between the fin panels F and the closure S. In a third portion of the curve, indicated at 84, the arc is flattened to move the jaws 28 in a more horizontal motion to prevent scrapping along the top fin F and/or plowing down on the gable G. These combined motions, in conjunction with the sealing force being exerted by actuation of the piston 54, rather than the cam 70 movement provides a top sealer 12 that has a relatively consistent sealing force to effect the fin F seal, while at the same time, reduces the opportunity to scrape the fin F or plow down on the gable top G.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A top sealer for a gable top package that is formed, filled and sealed on a form, fill and seal packaging machine, comprising:
   a frame;
   a carriage carried by the frame, the carriage mounted for reciprocation relative to the frame, the carriage defining in part a cylinder, the carriage having a cam follower mounted thereto;
   a pair of opposing arms, the arms operably connected to the carriage, each arm supporting a respective sealing jaw at about an end thereof, the arms operably connected to the carriage at an end opposite of the sealing jaw;
   a support portion configured for mounting the arms thereto, each arm being pivotably mounted to the support portion at a pivot point intermediate the sealing jaw and the opposite end, the arms mounted for pivoting movement of the sealing jaws along a profile toward and away from one another, the support portion having a cam follower mounted thereto;
   a piston residing in the cylinder, the piston including an extension portion operably connected to the support portion; and
   a cam element defining a first cam track for the carriage cam follower and a second cam track for the support portion cam element follower,
   wherein movement of the cam element moves the carriage which pivots the arms to move the sealing jaws toward one another and wherein movement of the cam moves the pivot point to steepen an arc of the profile at a beginning of the profile and to flatten the arc of the profile subsequent thereto.

2. The top sealer in accordance with claim 1 wherein the cam element is a rotating cam element having a smaller inner track for receiving the support cam follower and a larger outer track for receiving the carriage cam follower.

3. The top sealer in accordance with claim 1 wherein the support portion is mounted to the carriage by the piston.

4. The top sealer in accordance with claim 1 wherein one of the sealing jaws includes an open central region for accommodating a closure on the gable top package.

5. A top sealer for a gable top package that is formed, filled and sealed on a form, fill and seal packaging machine, the gable top packages being held stationary at the top sealer, the top sealer configured to seal a top fin on the gable top package, the top sealer comprising:
   an arm support;
   a piston, the piston including an extension portion operably connected to the arm support; and
   a pair of opposing arms pivotally mounted to the arm support, the arms each having a sealing jaw at about an end thereof, the arms being pivotal to move the sealing jaws toward and away from one another through an arc;
   means for linearly moving the arms coincident and cooperative with pivotal movement of the arms toward and away from one another; and
   a cam element,
   wherein the arm support is linearly movable toward and away from the package as the arms pivot moving the sealing jaws toward the package to alter the arc of the moving sealing jaws and wherein movement of the cam element pivots the arms to move the sealing jaws toward one another and wherein movement of the cam element pivots the arms to steepen an arc of the profile at a beginning of the profile and to flatten the arc of the profile subsequent thereto.

6. The top sealer in accordance with claim 5 wherein the support portion is movable toward the package to decrease the arc of the sealing jaws and is movable away from the package to increase the arc of the sealing jaw.

7. The top sealer in accordance with claim 5 including a carriage operably connected to the arms to effect pivotal movement of the arms.

8. The top sealer in accordance with claim 7 including links connecting the carriage to the arms such that linear movement of the carriage, through the links, translates to pivotal movement of the arms, the links being connected to the arms at respective ends of the arms opposite of the sealing jaws.

9. The top sealer in accordance with claim 8 including a cam operably connected to the carriage to linearly move the carriage.

10. The top sealer in accordance with claim 9 wherein the cam is operably connected to the arm support to linearly move the arm support toward and away from the package as the arms pivot.

11. The top sealer in accordance with claim 9 including a cylinder and piston carried by the carriage, the piston movable relative to the cylinder to further move the carriage relative to the support arm to impart a force for the sealing jaws to exert a sealing force on the package top fin.

* * * * *